Figure 5:
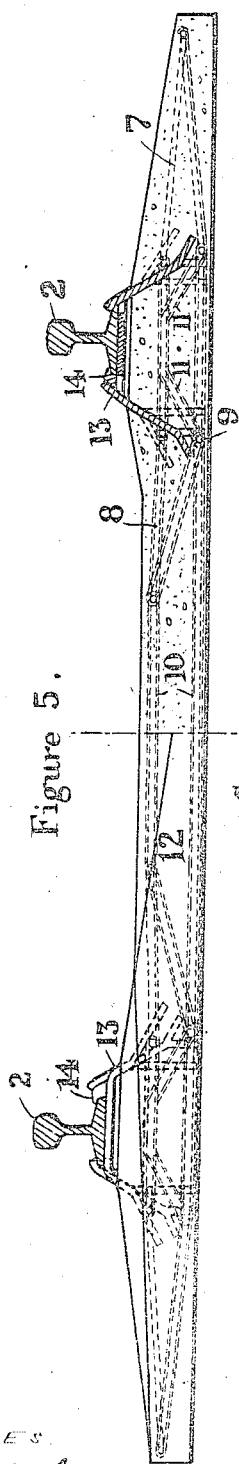

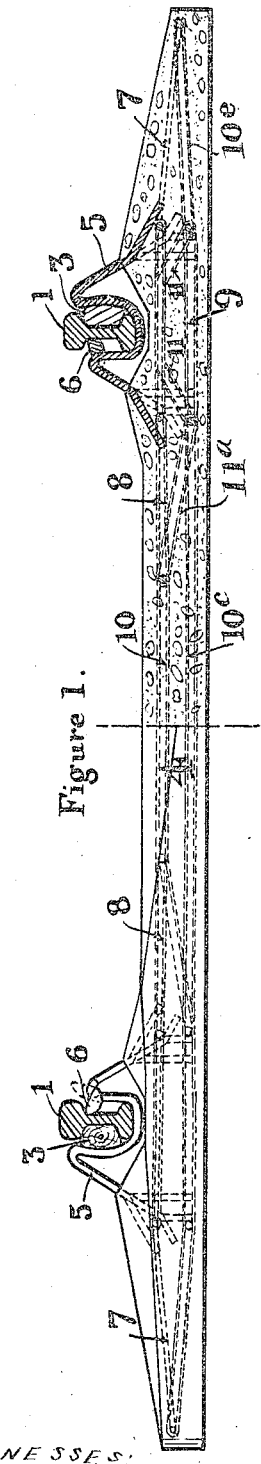
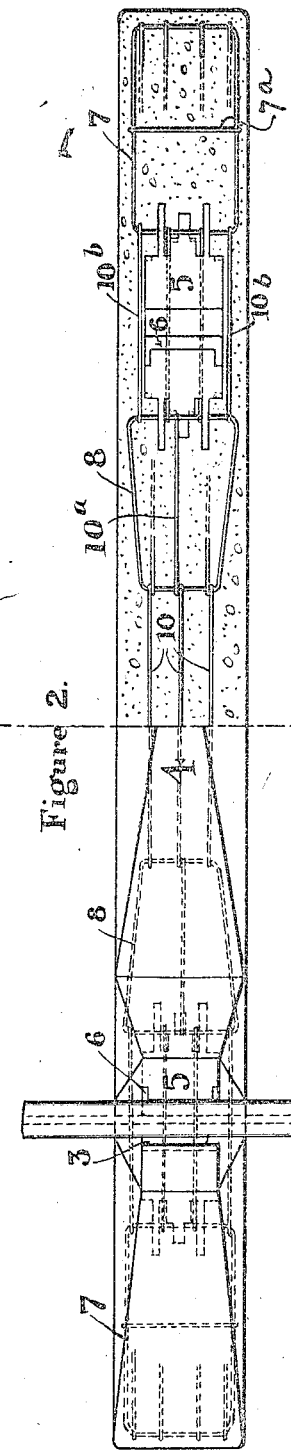
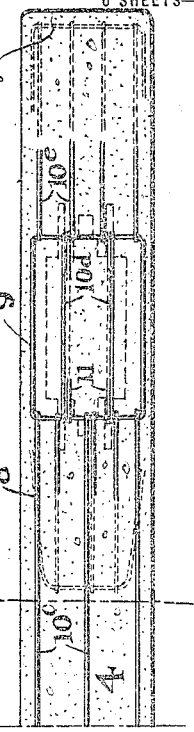
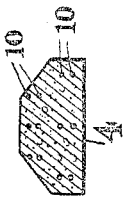

L. GREEN.
REINFORCED CONCRETE RAILROAD TIE.
APPLICATION FILED JUNE 12, 1913.

1,214,298.

Patented Jan. 30, 1917.
6 SHEETS—SHEET 2.

WITNESSES
INVENTOR:
ATTORNEYS

L. GREEN.
REINFORCED CONCRETE RAILROAD TIE.
APPLICATION FILED JUNE 12, 1913.
1,214,298.
Patented Jan. 30, 1917.
6 SHEETS—SHEET 3.
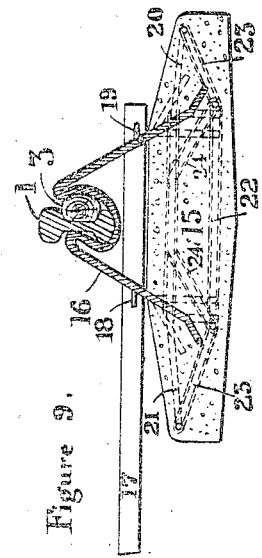
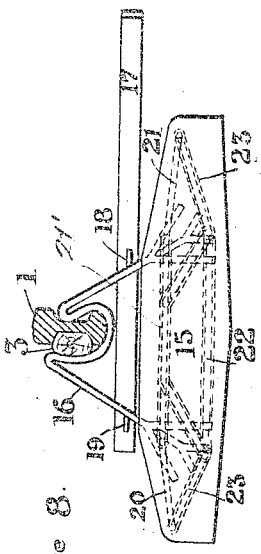
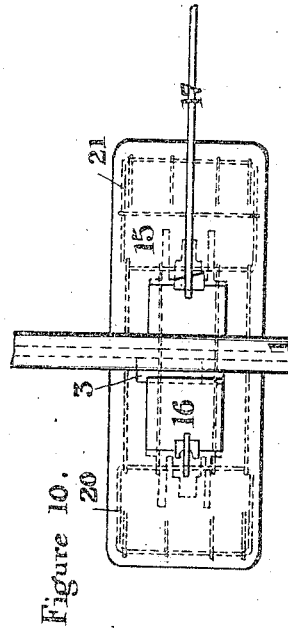
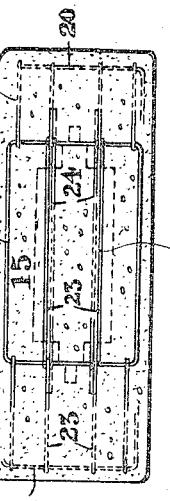
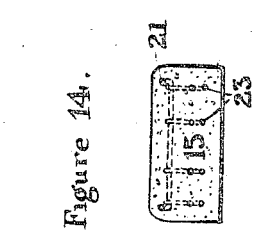
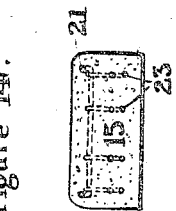
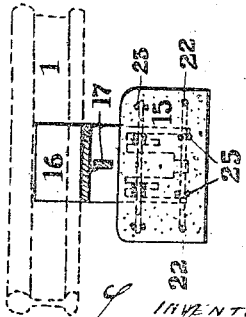

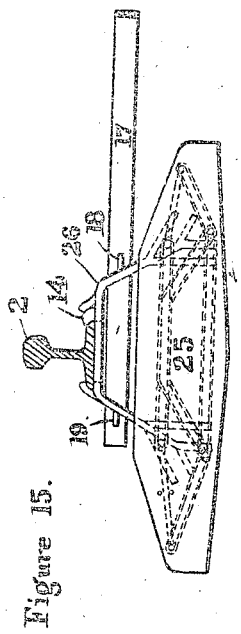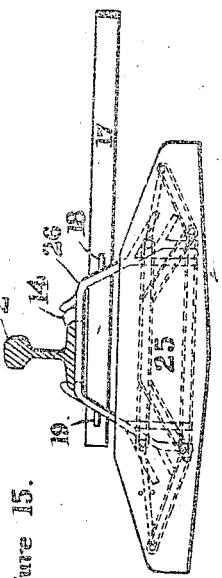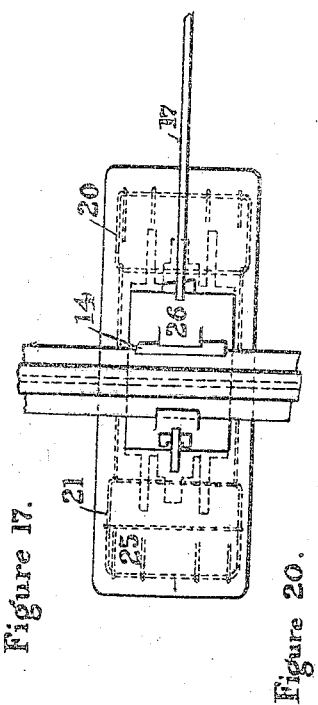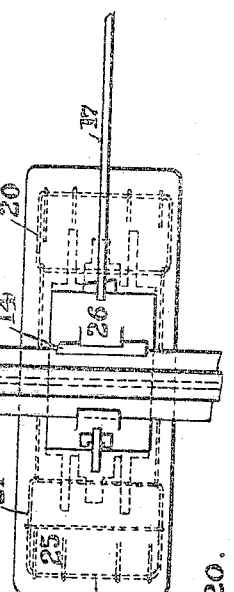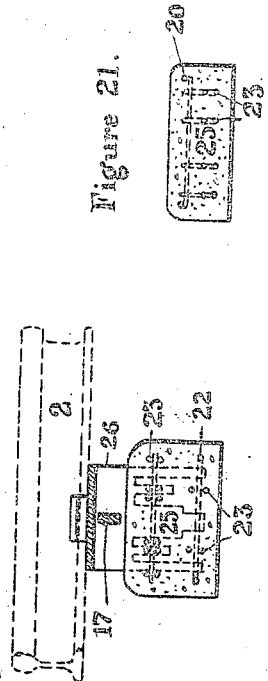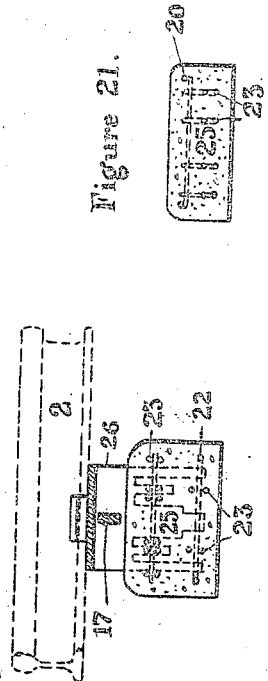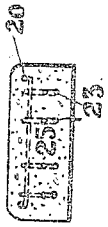

L. GREEN.
REINFORCED CONCRETE RAILROAD TIE.
APPLICATION FILED JUNE 12, 1913.
1,214,298.
Patented Jan. 30, 1917.
6 SHEETS—SHEET 5.
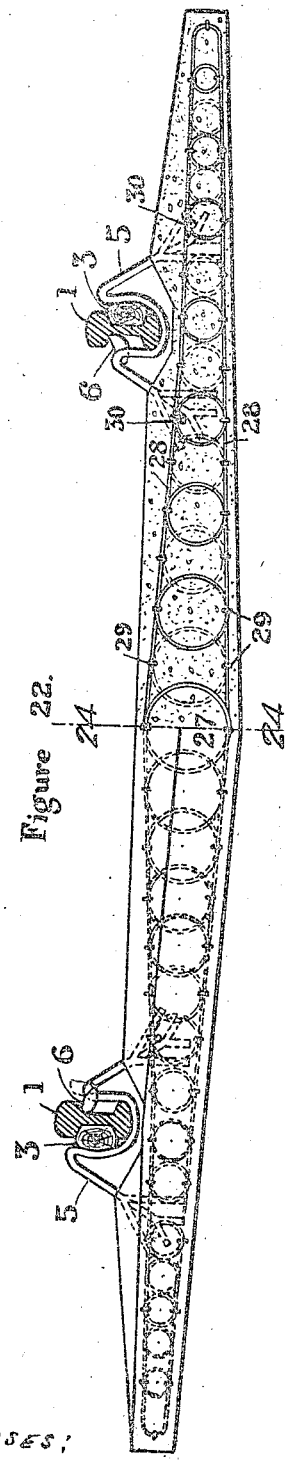
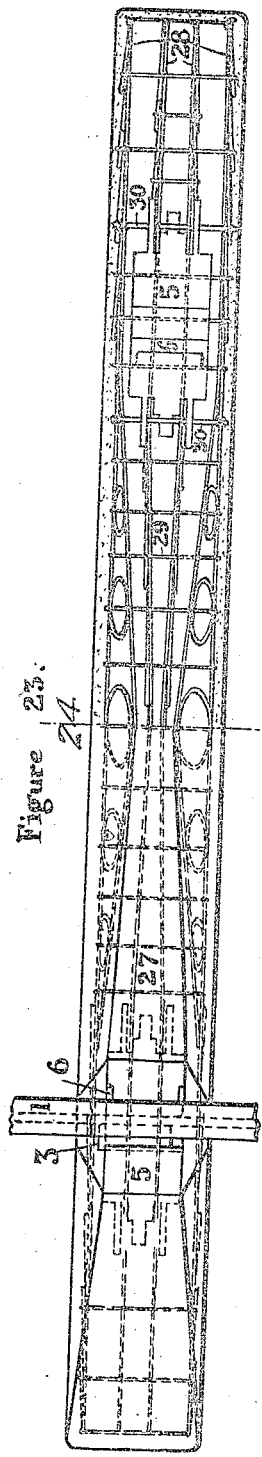
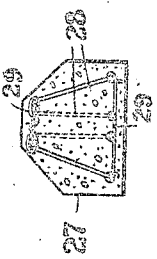

L. GREEN.
REINFORCED CONCRETE RAILROAD TIE.
APPLICATION FILED JUNE 12, 1913.

1,214,298. Patented Jan. 30, 1917.
6 SHEETS—SHEET 6.

WITNESSES:
John Murtagh
F. Hogg

INVENTOR:
Louis Green
or Goepel & Goepel
ATTORNEYS.

UNITED STATES PATENT OFFICE.

LOUIS GREEN, OF LONDON, ENGLAND.

REINFORCED-CONCRETE RAILROAD-TIE.

1,214,298.　　　　　Specification of Letters Patent.　Patented Jan. 30, 1917.

Application filed June 12, 1913. Serial No. 773,178.

*To all whom it may concern:*

Be it known that I, LOUIS GREEN, civil engineer, a subject of the King of Great Britain, residing at 172 Palace Chambers, Bridge street, London, England, have invented a certain new and useful Reinforced-Concrete Railroad-Tie, of which the following is a specification.

This invention relates to the method of supporting and holding down the rails forming the permanent way of railways, tramways, tramroads and the like, and consists in the application and combination of various forms of cast iron, wrought iron or steel and concrete as hereinafter specified for the production of an elastic and durable sleeper rail bearer or carrier, and the arrangement and combination of certain devices or means for securing the rails to the same—more especially:—

(*a*) The use of cast iron, wrought iron and steel plates or chairs bent or molded into suitable forms, among others, those shown on the drawings hereto appended, for the purpose of carrying the rails and securing them to the sleepers, either rigidly by the plate being in contact with the sleeper, or elastically by the plate being some distance away from the sleeper so that the plate may act as a spring between the rail and the sleeper as may be required, and the like.

(*b*) The combination of parts consists of cast iron, wrought iron or steel and concrete to form an independent support or sleeper under each rail, in the manner now effected by cast iron pot sleepers or plate sleepers, and the two supports or sleepers being connected by a tie-rod (or other device) to keep the rails to gage.

(*c*) The special form of reinforcement for combining the cast iron, wrought iron or steel plates with the concrete which may be described as follows:—The ends of the bent plate (which are to be splayed in such a manner as may be found suitable, among others, those shown on the drawings) are tied together with iron or steel wire or rods to prevent any bursting effect that the plate when pressed down may tend to produce in the sleeper.

(*d*) A form of sleeper for use in combination with the above, referred to in the aforesaid paragraphs (*a*) and (*c*) designed as a cantaliver so as to distribute uniformly the whole weight put on the sleeper over its whole bearing surface on the ground.

The combination and arrangement of parts of this invention may be briefly described as follows:—

The first series of combinations and parts is shown in Figures 1 to 4. In Fig. 1 the left half is a side elevation and the right half a vertical longitudinal section. In Fig. 2 the left half is a plan and the right half a horizontal section showing the upper system of reinforcement. Fig. 3 is a second horizontal sectional plan showing lower system of reinforcement. Fig. 4 is a cross section on line 4—4, Fig. 3.

Figure 6:
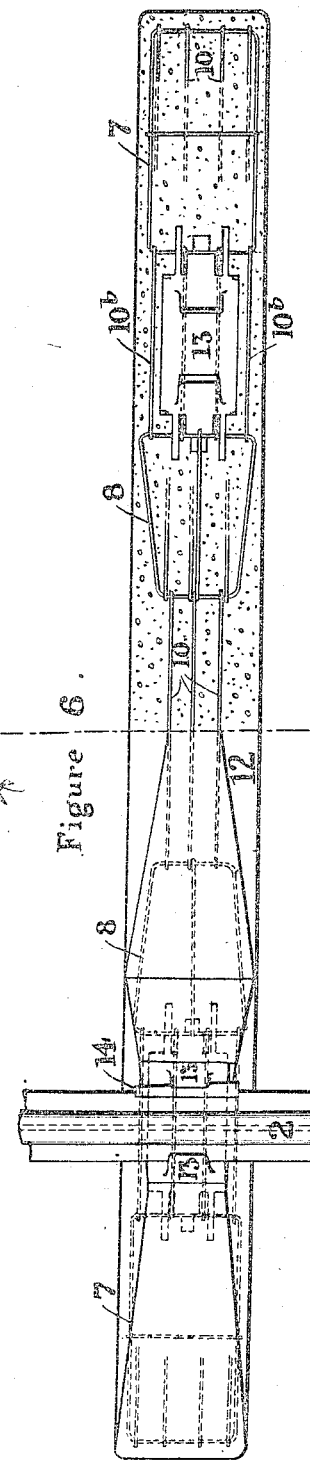
Figure 7:
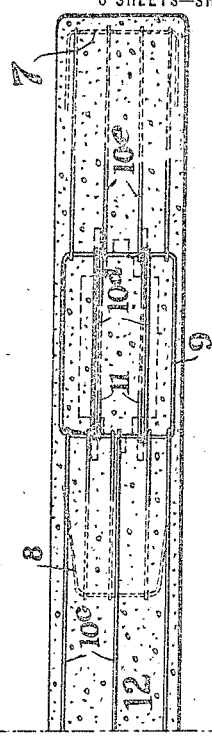

The second series of combinations and parts is shown in Figs. 5, 6 and 7. In Fig. 5 the left half is a side elevation and the right half a vertical longitudinal section. In Fig. 6 the left half is a plan and the right half a horizontal section showing the upper line of reinforcement. Fig. 7 is a second horizontal section showing the lower system of reinforcement.

The third series of combinations and parts is shown in Figs. 8 to 14. Fig. 8 is a side elevation. Fig. 9 is a cross sectional elevation. Fig. 10 is a plan. Fig. 11 is a horizontal section showing the upper system of reinforcement. Fig. 12 is a second horizontal section with lower system of reinforcement. Figs. 13 and 14 are cross sections.

The fourth series of combinations and parts is shown in Figs. 15 to 21. Fig. 15 is a side elevation. Fig. 16 is a sectional elevation. Fig. 17 is a plan. Fig. 18 is a horizontal section showing the upper system of reinforcement. Fig. 19 is a second horizontal section showing the lower system of reinforcement. Figs. 20 and 21 are cross sections.

The fifth series of combinations and parts is shown in Figs. 22, 23 and 24. In Fig. 22 the left half is a side elevation and the right half a vertical longitudinal section. In Fig. 23 the left half is a plan and the right half a horizontal section showing the system of reinforcement. Fig. 24 is a cross section on line 24, Figs. 22 and 23.

Figure 25:
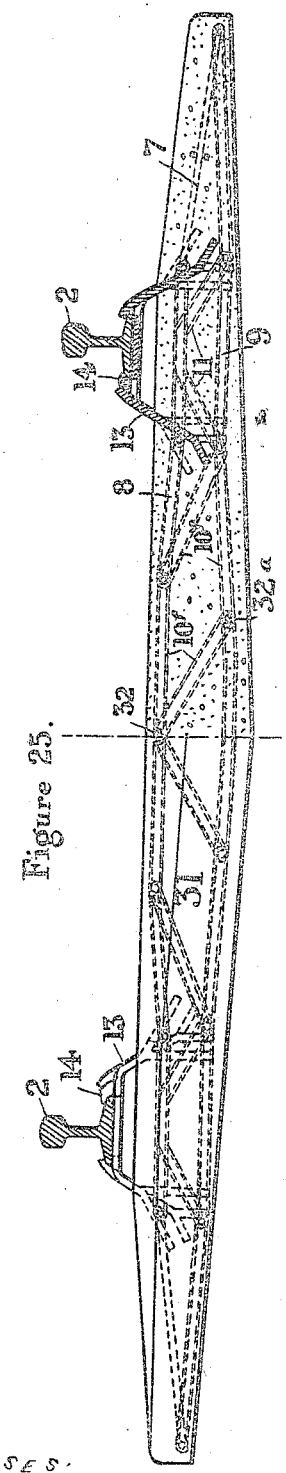
Figure 26:
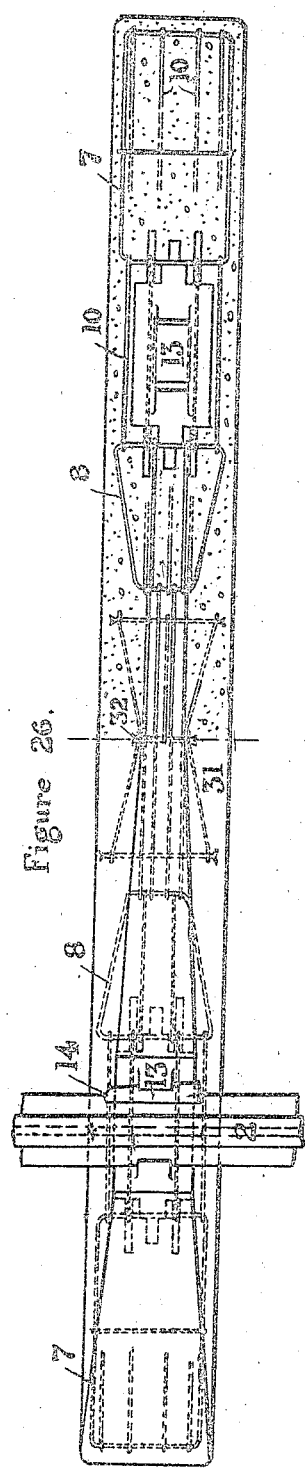
Figure 27:
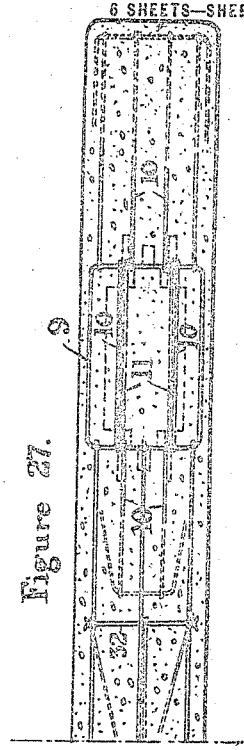
Figure 28:
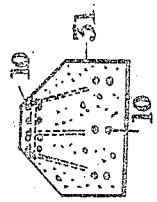

The sixth series of combinations and parts is shown in Figs. 25 to 28. In Fig. 25 the left half is a side elevation and the right half a vertical longitudinal section. In Fig. 26 the left half is a plan and the right half a horizontal section showing the upper system of reinforcement. Fig. 27 shows a half sectional plan with lower system of reinforcement. Fig. 28 shows a cross section at center of sleeper.

Referring to Figs. 1–4 of the drawings, the cross-sleeper 4 composed of cement concrete, strengthened with a preferably steel reinforcement, is, as illustrated, of uniform breadth throughout its length, of a minimum depth at the two ends gradually increasing to a maximum depth at about one-third of its length from each end, which maximum depth, however, is exceeded at the points where the legs or supporting members of the chairs 5 are embedded in the concrete, this excess material being sloped off longitudinally and laterally into the general run of the outline of the sleeper. The central portion of uniform depth is also chamfered away to an increasing extent toward the center of the sleeper. The underside of the sleeper is straight. The two legs or supporting members 5 of the chair are arranged one on each side of the rail 1, and, as shown, splayed out with respect to one another and transversely of the track or rail, while the embedded portions of the legs are preferably divided into a number of tongues, which are also in a known manner splayed out in different directions and for well understood reasons. The aforesaid tongues are also suitably splayed out in order that they may according to the present invention be tied together, by means preferably forming part of the longitudinal ties of the reinforcing system with the object of avoiding as far as possible any bursting effect on the concrete due to load on the rails, thus incidentally diminishing the amount of disintegration of the concrete by reducing to a corresponding extent the amount of vibration in the lower portions of the legs under a rolling load.

The reinforcing members comprise an upper and a lower system of preferably wires or rods and hoops of wrought iron, or other suitable metal, but preferably of steel.

As may be seen in Fig. 1, the upper and lower systems are parallel throughout the greater part of the length of the sleeper and toward the ends of the sleeper incline together and finally are united at the extreme ends.

The upper system of reinforcement, as shown in Fig. 2, comprises a hoop or right-angled link 7 at each end of the sleeper having the inner end interlaced with the adjacent set of aforesaid tongues on the leg of the corresponding chair and provided with a transverse stay $7^a$ midway of its length; a hoop or link 8 on the opposite side of each chair with transverse parallel end bars, the outer bar of each link 8 being interlaced with the corresponding adjacent set of aforesaid tongues; a set of three looped rods 10 connecting the inner adjacent bars of the two links 8; a single looped rod $10^a$ for each link 8 centrally connecting the inner and outer transverse bars thereof and four looped rods $10^b$ connecting the outer transverse bar of each link 8 with the inner transverse bar of the corresponding link 7.

The lower system of reinforcement, as shown in Fig. 3, comprises a hoop or right-angled link 9 for each chair having the inner and outer transverse bars each interlaced with the corresponding set of aforesaid tongues; a set of three looped rods $10^c$ connecting the inner transverse bars of the two links 9; a set of two looped rods $10^d$ connecting the inner with the outer transverse bar of each link 9 and a set of four looped rods $10^e$ connecting the outer transverse bar of each link 9 with the outer transverse bar of the corresponding link 7 in the upper system.

The upper and lower systems are further interconnected, as shown in Figs. 1, 2 and 3, by diagonally arranged looped rods $11^a$ connecting the inner transverse bar of each link 8 in the upper system with the inner transverse bar of the corresponding link 9 in the lower system. The transverse bars of each link 9 in the lower system are also further stayed by a set of two rods 11 looped around said bars and bent at first diagonally toward the center line of the rail and then parallel to and at the same level as the tie rods $10^b$ in the upper system connecting the links 8 and 7.

Instead of looped rods, single rods or wires may be employed and their number increased.

The diagonal rods 11 may be reversed in direction so as to extend downward from the transverse bars of the links 8 and 7 in the upper system or both sets of diagonal rods may be used.

The chair, as shown in Fig. 1, is designed for a bull-headed rail 1 and is made of wrought iron or mild steel bent to form a resilient suspended seating for the rail in one piece with two legs 5 embedded partly in the concrete and so as to provide a clearance space between the underside of the rail seating and the upper surface of the sleeper. Instead of supporting the rail on the side opposite to the key by bending the chair so as to conform to the outline of the rail on that side, I may provide a cast-iron or steel stop 6 adapted by extensions at each end to embrace the inner jaw of the chair. This stop serves to preserve the proper width or gage between the rails and is capable of circular movement as about a pivot constituted by the rounded upper extremity of said jaw, as shown by dotted lines at the left hand of Fig. 1. This arrangement is such that the path of movement of the outer extremity of the stop is intersected by the corresponding shoulder of the head of the rail, thus allowing the rail to be withdrawn from the chair, while the stop 6 itself cannot be removed without first withdrawing the rail. The usual rail key is shown at 3. The legs 5 may be given a slight outward camber.

The reinforced cross-sleeper 12, illustrated in Figs. 5-7, is identical in every respect with that already described with reference to Figs. 1-4, except that a resilient wrought iron or mild steel support 13 is provided for a flat-bottomed rail 2 secured in a known manner by a key 14 and the excess concrete material around the embedded legs of the support is shaped accordingly. The two supporting members or legs of the resilient support 13 are splayed out, partly embedded and prevented from spreading as already described.

Referring to Figs. 8-14, the independent block sleepers 15 are provided with rail chairs 16 affording a resilient seating for the rail, as already described with reference to Fig. 1, except that the stop 6 is omitted, the inner jaw of the chair being suitably formed to constitute a direct support for the inside of the rail. The legs or supporting members of the chair are splayed out, partly embedded and prevented from spreading as already described with reference to Fig. 1. The arrangement of the reinforcing members in each sleeper 15 is identical with that of the corresponding portion of the cross-sleeper described with reference to Fig. 1, the connecting tie rods 10 and 10$^c$ in the central portion of said cross-sleeper being obviously not present, the links 20, 21, and connecting looped rods 21$^1$ in the upper system corresponding to the links 7 and 8 and looped rods 10$^b$ respectively of Fig. 1, the tie rods 23 and 23$^1$ corresponding to the tie rods 11$^a$ and 10$^c$ connecting the links 8 and 7 of Fig. 1, to the link 9, the link 22 in the lower system corresponding to the link 9, the looped rods 22$^1$ to the looped rods 10$^d$ and diagonal ties 24, interconnecting the upper and lower systems also as described with reference to Fig. 1. The under-surface of the sleepers, however, instead of being straight, is inclined upwardly and outwardly on either side of the center line of the rail.

The chair 16 is moreover raised sufficiently to enable the usual gage or tie rod or bar 17 to be passed through slots in both legs of the chairs with a clearance between the lower edge of the bar and the upper surface of the sleeper and between the upper edge of the bar and the lower surface of the rail seating, so that the gage bar may act on both legs, tying them together and maintaining the resilient nature and suspension of the seating. Incidentally the tie bar 17 thus employed acts to reduce any further tendency to produce a bursting effect on the concrete by spreading of the legs under load, as well as any tendency to disintegrate the concrete by obstructing the travel downward of vibration in the legs of the chair under a rolling load. The tie rod or bar 17 is therefore conveniently made of sufficient length to extend on both sides of the track through both legs of the chairs, the said legs being braced together and the gage of the rails maintained by a cotter 18 and gib 19 for instance.

In Figs. 15-21 independent block sleepers 25 are shown identical with the sleepers 15 shown in Figs. 8-14, but provided with a resilient seating 26 for a flat-bottomed rail 2. The gage or tie bar 17 is utilized in a like manner and for like purposes as the bar 17 already described with reference to Figs. 8-14.

With reference to the modified arrangement of reinforcement illustrated as applied to a cross-sleeper 27 in Figs. 22-24:—The longitudinal rods are pitched apart so as to conform more or less to the desired shape of the sleeper and are adapted to form the upper and lower chords of a girder on the cantaliver system, the rods of the two chords being suitably connected together at the ends of the sleeper, and the rods in each bottom being stayed apart by transverse binding wires 29. The width of the lower chord is uniform throughout its length. The width of the upper chord is at a minimum at the center of the sleeper, widening out in a substantially gradual manner toward each end of the sleeper. The depth of the girders is greatest at the center of the sleeper, gradually diminishing toward each end of the sleeper upwardly and outwardly, the base of the sleeper following the same contour and the upper chord declining downwardly and outwardly from the center of the sleeper. Each longitudinal rod of the upper chord is connected to the corresponding longitudinal rod in the lower chord by rings 28, the inner rings being preferably in a staggered relation to the outer rings, as shown. The splayed tongues at the embedded ends of the legs of the rail chairs 5, or it may be of the rail supports, are interlaced with the reinforcing girders and prevented from spreading by transverse bars 30 secured firmly to the rods of the upper chord. The under-surface of the sleeper inclines upwardly and outwardly from the center, following the contour of the girder, and the upper surface of the sleeper may be chamfered off, as shown.

In the modified arrangement of reinforcement as applied to a cross-sleeper and illustrated in Figs. 25-28, the reinforcing elements as described with reference to Figs. 1-4 are utilized as the upper and lower systems of the sleeper 31, the corresponding connecting rods 10 to an increased number and rods 10$^c$ in the upper and lower systems respectively at the central portion of the sleeper being further connected together by additional diagonally arranged rods 10$^f$ looped around an additional centrally arranged transverse bar 32 in the upper system and corresponding transverse bars 32$^a$ in the lower system, whereby the load is transferred to the center of the sleeper, which is deepest at that point, the upper and lower system of reinforcement being correspondingly inclined.

It should be understood that the extent to which the legs of the rail support are embedded depends upon the proportions of the legs and the extent of the rolling load on the one hand and the amount of elasticity desired upon the other hand. It should also be understood that the expression rail support is intended to cover either a direct support for the rail whether of the flanged or double-headed type or a support for an intermediate rail carrier such as a chair whether rigid or resilient.

The arrangements of reinforcing elements hereinbefore described are adapted in every case to efficiently distribute over the entire sleeper the stresses to which the sleeper, whether evenly packed, or packed hard at the center or beneath the rails only, or hard at both ends only, and the rail support or chair are subjected during traffic, and also in the case of cross-sleepers to maintain the gage of the rails.

What I claim is:—

1. A railroad tie, comprising a reinforced concrete sleeper, a strip of metal bent to form a resilient seating for a rail and having opposite supporting legs splayed transversely of the rail for said seating, said legs being partly embedded in said sleeper, and non-extensible members between and directly connected to said legs for preventing said legs from spreading relatively to one another.

2. A railroad tie, comprising a reinforced concrete sleeper, a strip of metal bent to form a resilient chair seating for a flanged rail and two supporting legs splayed transversely of the rail for said chair, said legs being partly embedded in said sleeper, and non-extensible members between and directly connected to said legs for preventing said legs from spreading relatively to one another.

3. A railroad tie, comprising a reinforced concrete sleeper, a strip of metal bent to form a resilient seating for a rail and two supporting legs splayed transversely of the rail for said seating, said legs being partly embedded in said sleeper and prevented from spreading relatively to one another by members froming part of the longitudinal ties of the reinforcement of said sleeper, said members being between and directly connected to said legs.

4. A railroad tie, comprising a concrete sleeper reinforced by upper and lower longitudinal members and by terminal transverse members connecting together said upper longitudinal members with said lower longitudinal members and by intermediate transverse members connecting together said upper and lower longitudinal members respectively, a strip of metal bent to form a resilient seating for a rail and having two opposite supporting legs splayed transversely of the rail for said seating, said legs being partly embedded in said sleeper and said intermediate transverse members being between and directly connected to said legs to prevent said legs from spreading relatively to one another.

5. A railroad tie, comprising a concrete cross-sleeper reinforced by an upper and lower system of longitudinal and transverse members, said upper system being located above the neutral zone and consisting of two end portions, each arranged symmetrically with respect to the center of the corresponding rail and comprising terminal closed hoops and intermediate connecting longitudinal ties and of a central portion consisting of longitudinal ties connecting the adjacent transverse portions of the two adjacent terminal closed hoops of the said two end portions, said lower system consisting of two end portions, each arranged symmetrically with respect to the center of the corresponding rail and comprising a central closed hoop located below said neutral zone, longitudinal ties connecting the transverse portions of said central hoop with the outer transverse portions of said terminal hoops in said upper system and diagonal ties connected with the transverse portions of said central hoop and extending upwardly beyond said neutral zone, forming together with said longitudinal ties in the lower system a series of trusses on each side of a rail and of a central portion consisting of longitudinal ties connecting the adjacent transverse portions of the two said central hoops and rail supports, each having portions embedded in said sleeper at the apices of the corresponding series of said trusses, whereby the thrusts of said supports are distributed.

6. A railroad tie, comprising a concrete cross-sleeper reinforced by an upper and lower system of longitudinal and transverse members, said upper system being located above the neutral zone and consisting of two end portions, each arranged symmetrically with respect to the center of the corresponding rail and comprising terminal closed hoops and intermediate connecting longitudinal ties, and of a central portion consisting of longitudinal ties connecting the adjacent transverse portions of the two adjacent terminal closed hoops of the said two end portions, said lower system consisting of two end portions, each arranged symmetrically with respect to the center of the corresponding rail and comprising a central closed hoop located below said neutral zone, longitudinal ties connecting the transverse portions of said central hoop with the outer transverse portions of said terminal hoops in said upper system and diagonal ties connected with the transverse portions of said central hoop and extending upwardly beyond said neutral zone, forming together with said longitudinal ties in the lower system a series of trusses on each side of a rail and of a central portion consisting of longitudinal ties connecting the adjacent transverse portions of the two said central hoops, and rail supports, each consisting of a strip of metal bent to form a resilient seating for the corresponding rail and two supporting legs splayed transversely of the rail for said seating, said legs being partly embedded in said sleeper at the apices of the corresponding series of said trusses whereby the thrusts of said supports are distributed.

7. A railroad tie, comprising a concrete cross-sleeper reinforced by an upper and lower system of longitudinal and transverse members, said upper system being located above the neutral zone and consisting of two end portions, each arranged symmetrically with respect to the center of the corresponding rail and comprising terminal closed hoops and intermediate connecting longitudinal ties, and of a central portion consisting of longitudinal ties connecting the adjacent transverse portions of the two adjacent terminal closed hoops of the said two end portions, said lower system consisting of two end portions, each arranged symmetrically with respect to the center of the corresponding rail and comprising a central closed hoop located below said neutral zone, longitudinal ties connecting the transverse portions of said central hoop with the outer transverse portions of said terminal hoops in said upper system and diagonal ties connected with the transverse portions of said central hoop and extending upwardly beyond said neutral zone, forming together with said longitudinal ties in the lower system a series of trusses on each side of a rail and of a central portion consisting of longitudinal ties connecting the adjacent transverse portions of the two said central hoops, and rail supports, each consisting of a strip of metal bent to form a chair seating for a bull-headed rail and two supporting legs splayed transversely of said rail for said chair, said legs being partly embedded in said sleeper at the apices of the corresponding series of said trusses and being adapted to be engaged by said upper and lower systems of reinforcement so as to be prevented from spreading relatively to one another.

8. A railroad tie, comprising a reinforced concrete sleeper, a rail support consisting of a strip of metal bent to form a resilient chair seating for a bull-headed rail and two supporting legs splayed transversely of the rail, said legs being partly embedded in said sleeper and said chair seating comprising a vertical portion on one side of said rail, a seating portion for the bottom of said rail and a portion adapted to hold the rail wedge, and a pivotable metal stop adapted to embrace the upper end of said vertical portion of said chair seating and normally to act as an abutment between the corresponding lower face of the upper head of said rail and said upper end and when clear of said face to be moved into a vertical position clear of said head.

9. A railroad tie, comprising a reinforced concrete sleeper, a strip of metal bent to form a seating for a rail, and having opposite supporting legs splayed transversely for the said seating, said legs being partly embedded in the said sleeper, and non-extensible members between said opposite legs and adapted to prevent them from spreading relatively to one another.

In witness whereof I have hereunto set my hand in presence of two witnesses.

LOUIS GREEN.

Witnesses:
 HENRY BIRKBECK,
 O. J. WORTH.